Sept. 2, 1958 V. WALKER 2,849,841
GLASS CUTTING MACHINES
Filed July 12, 1955 5 Sheets-Sheet 1

INVENTOR
VICTOR WALKER
BY
ATTORNEYS

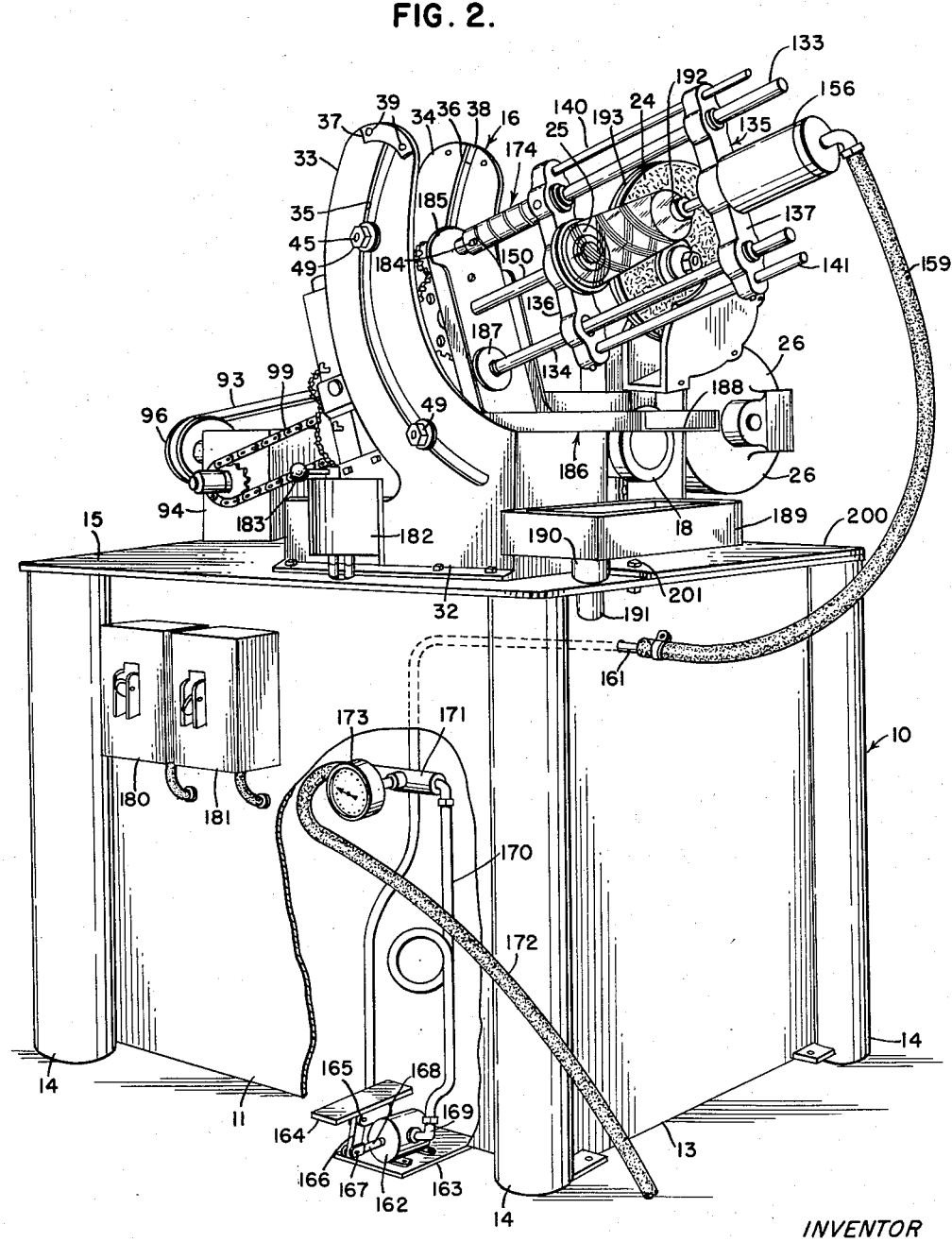

Sept. 2, 1958 V. WALKER 2,849,841
GLASS CUTTING MACHINES
Filed July 12, 1955 5 Sheets-Sheet 3
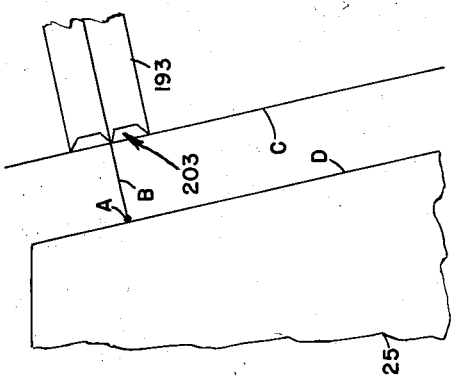
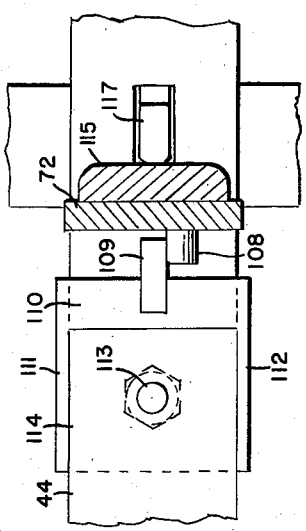
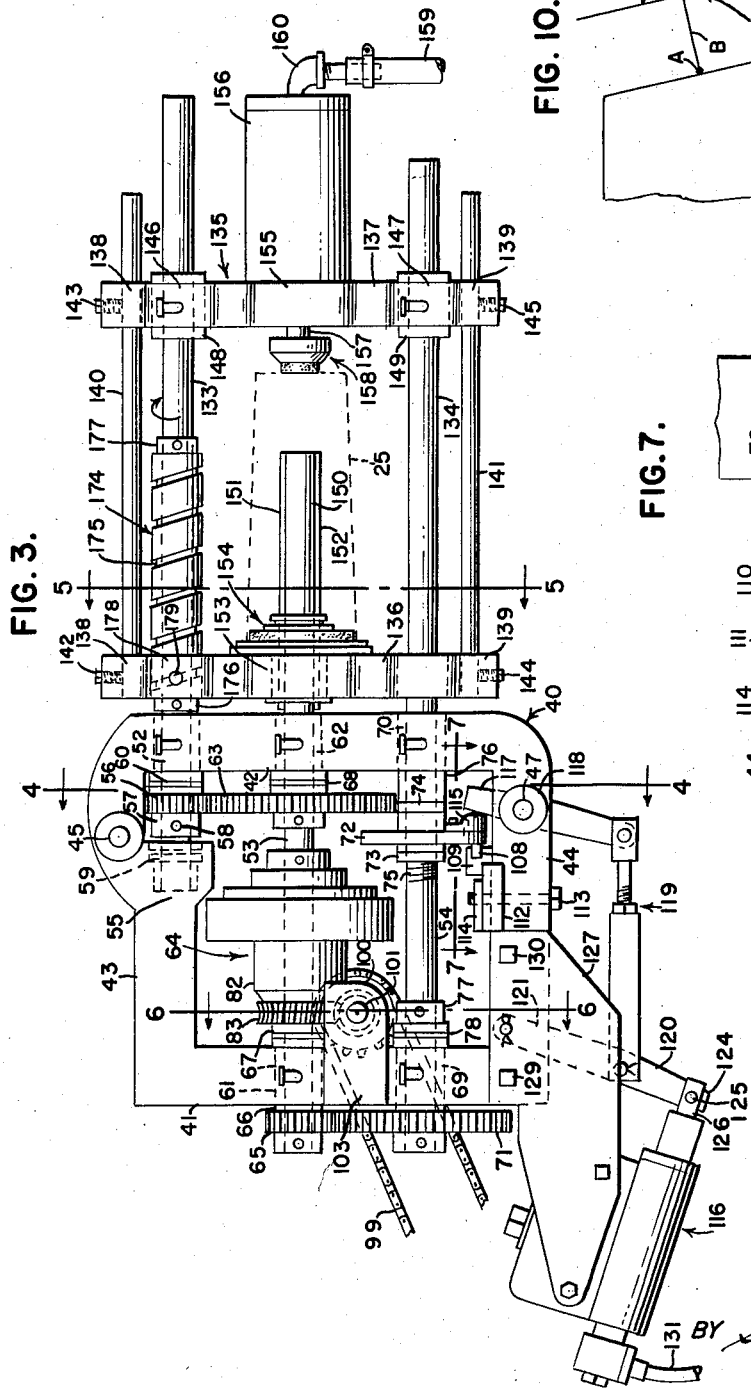
INVENTOR
VICTOR WALKER
BY
ATTORNEYS Sept. 2, 1958  V. WALKER  2,849,841
GLASS CUTTING MACHINES
Filed July 12, 1955  5 Sheets-Sheet 4
FIG. 4.
FIG. 5.
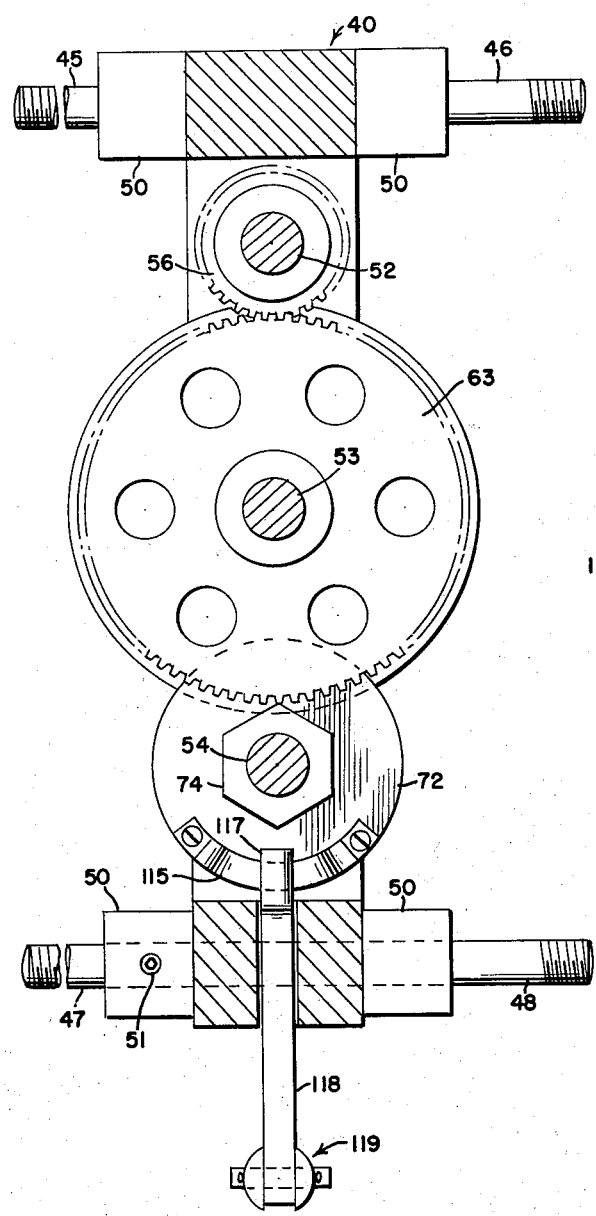
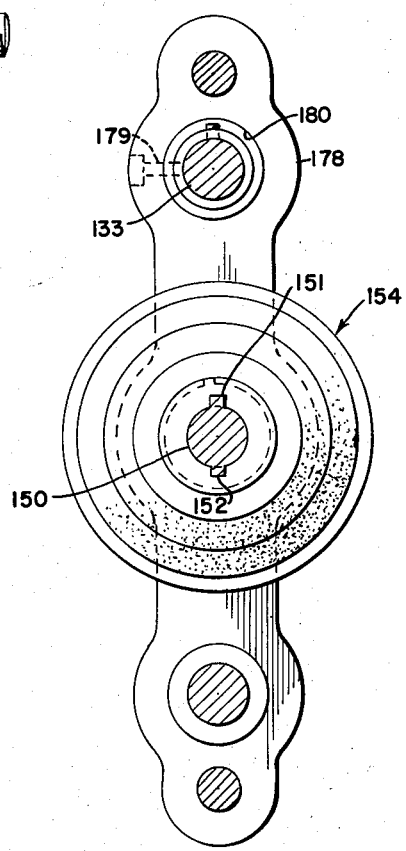
*INVENTOR*
VICTOR WALKER
BY
*ATTORNEYS*

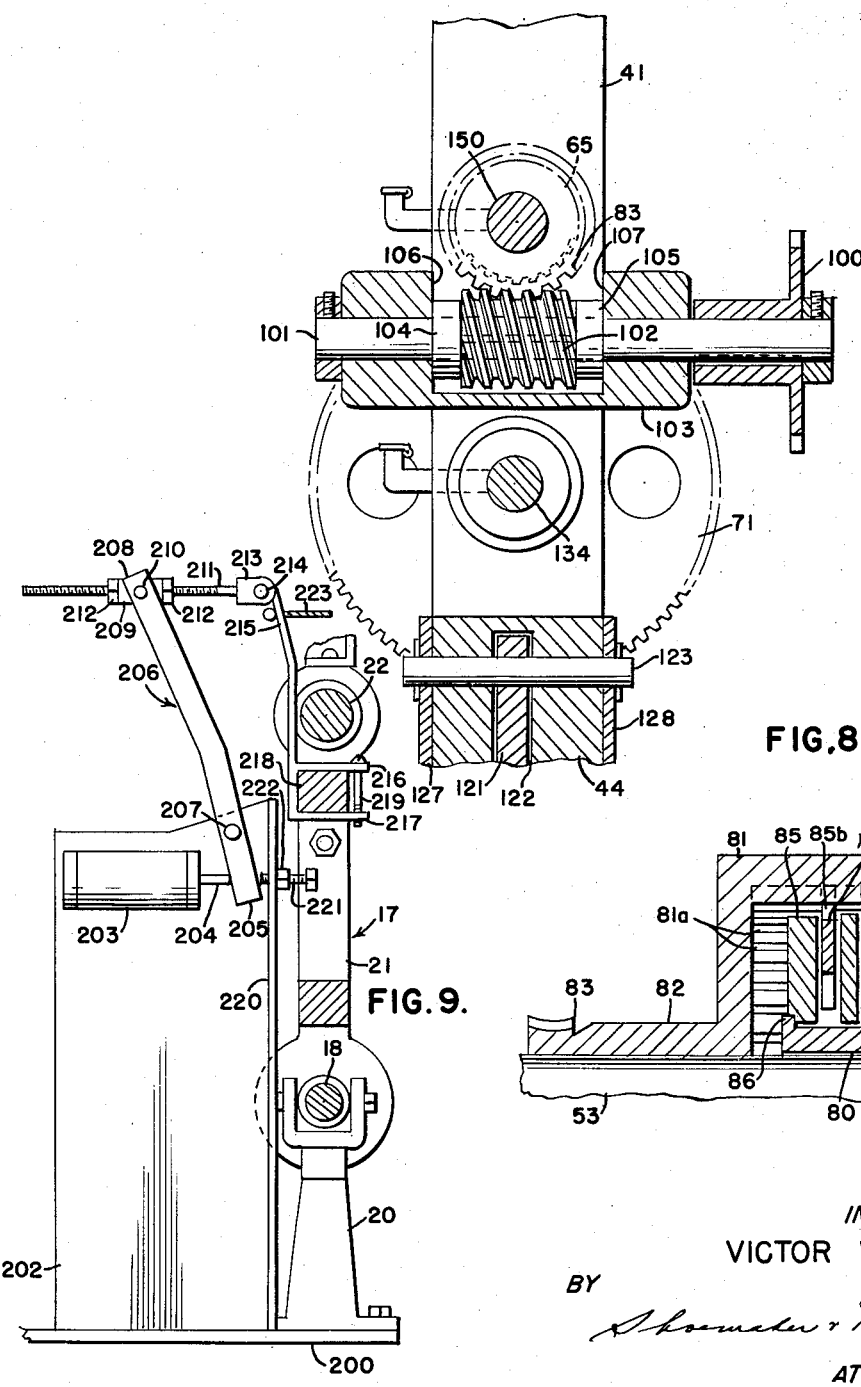

United States Patent Office 2,849,841
Patented Sept. 2, 1958

2,849,841

GLASS CUTTING MACHINES

Victor Walker, Morgantown, W. Va.

Application July 12, 1955, Serial No. 521,496

8 Claims. (Cl. 51—95)

This invention relates to glass grinding machines in general and more specifically it relates to a machine particularly adapted to grind or cut special patterns in glass articles such as tumblers, goblets and the like.

Machines have been, in the past, developed for the purpose of cutting spiral patterns in glassware but none, to my knowledge, lends itself to the speed and flexibility of the present invention.

One object of this invention resides in the provision of a machine for cutting spiral patterns in glass which is characterized by its rapidity of operation and by its adaptability to rapid change in set up so that not only can a number of similar articles be rapidly processed but also the change over from operation upon one type of article to another requires but a minimum of time.

Another object of this invention is to provide a machine of the character described wherein many different types of spiral patterns may be accomplished and wherein the machine is sufficiently flexible as to accommodate glass articels of many forms.

Still another object of this invention is to provide an improved form of machine for cutting spiral patterns on glass wherein there is a work-holding carriage which moves back and forth along a linear path and wherein a complete pattern-forming operation is performed upon each back and forth movement of the carriage.

A further object of this invention is to provide an improved form of glass cutting machine in conformity with the preceding object wherein automatic control means is provided to arrest the motion of the carriage at opposite ends of its path of travel so as to permit a new work piece to be placed in the machine.

Another object of this invention resides in the provision of a machine for cutting spiral patterns on glassware which embodies a grinding unit and a work-holding unit, each independently mounted upon a common base and wherein the work-holding unit incorporates a carriage which moves back and forth along a linear path with there being common control means for controlled movement of the grinding unit into and out of engagement with the work and for arresting movement of the carriage at opposite ends of its path of travel whereby a spiral pattern cutting operation is performed during each unidirectional movement of the carriage.

A further object of this invention resides in the provision of an improved form of work-holding unit forming part of a machine for cutting special patterns on glass in which the work-holding unit embodies a support frame having supporting shaft portions projecting therefrom with a carriage slidably carried by such shaft portion with means provided on at least one of the shaft portions and in operative engagement with the carriage to impart back and forth linear motion thereto according to a predetermined pattern so that spiral designs may be produced upon a rotated work piece supported by the carriage.

Still another object of this invention is to provide an improved work-holding unit for spiral-pattern glass cutting machines wherein a reciprocable carriage for holding a work piece is capable of angular adjustment to accommodate for various leads in different spiral patterns to be cut.

Another object of this invention is to provide an improved work-holding unit encompassing at least one supporting upright and a support frame secured thereto wherein the support frame embodies studs received within an arcuate slot in the upright so that the support frame and an associated reciprocable carriage for holding work are adjustably movable with respect to the upright so as to present the work at adjusted angles to a grinding wheel whereby to accommodate various leads in different special patterns to be cut.

A still further object of this invention is to provide an improved work-holding unit for the purpose described which includes a support frame journaling a cam shaft and a central shaft therein with the shafts being disposed in parallelism and each having projecting end portions slidably receiving a carriage thereon, with the cam shaft having means engaging the carriage for imparting linear motion thereto and the central shaft having associated therewith control means to arrest the movement of the carriage after a predetermined extent of movement in one direction so as to permit reversal of its direction of movement back to an original position and wherein a chuck carried by the carriage is rotated simultaneously with linear motion of the carriage to generate a complete spiral pattern upon a work piece held therein during each unidirectional movement of the carriage.

Another object of this invention resides in the provision of an improved form of work-holding unit in which a support frame has journaled therein a cam shaft, a drive shaft and a control shaft with the cam shaft and control shaft mounted on opposite sides of the drive shaft and with all of the shafts disposed in spaced parallelism, there being an end portion of each of the shafts projecting from the support frame with a carriage slidably supported on the end portions of the cam shaft and the control shaft, wherein the carriage supports a chuck rotatably driven by the drive shaft extension and with common reversible drive means for all of the shafts which includes a slip-type clutch interrupting drive to one of the shafts upon engagement of a stop pin on the control shaft with abutment means on the support frame.

A still further object of this invention is to provide an improved glass grinding machine including a work-holding unit and a grinding unit disposed in side-by-side relation wherein the work-holding unit includes a support frame reciprocably supporting a carriage which includes a rotatable chuck and wherein the grinding unit includes a grinding wheel swingably mounted for movement into and out of contact with a work piece held in the carriage chuck, the support frame having journaled therein a control shaft and there being means for simultaneously driving the chuck, for moving the carriage and for rotating the control shaft and the control shaft being effective to interrupt the drive means and at the same time to control swinging of the grinding wheel into and out of engagement with the work.

Fig. 2 is another perspective view of the glass cutting machine showing the parts in operation;

Fig. 3 is an elevational view of the main component of the work-holding unit;

Fig. 4 is an enlarged vertical section taken substantially along the plane of section line 4—4 in Fig. 3 and showing the main drive mechanism as well as structural features of the control mechanism;

Fig. 5 is an enlarged vertical section taken substantially along the plane of section line 5—5 in Fig. 3 showing the construction of a portion of the carriage and also showing the construction of the driving portion of the chuck associated therewith;

Fig. 6 is an enlarged vertical section taken substantially along the plane of section line 6—6 in Fig. 3 showing the main drive input;

Fig. 7 is an enlarged horizontal section taken substantially along the plane of section line 7—7 in Fig. 3 showing details of the cam disc construction and illustrating the relationship of parts when the carriage is at one end of its path of movement;

Fig. 8 is an enlarged sectional view taken through the clutch assemblage to show the details of internal construction and its relationship to the main drive shaft;

Fig. 9 is a sectional view showing details of the means for swinging the grinding wheel toward and away from an associated workpiece; and Fig. 10 is a diagrammatic view illustrating the manner of adjusting movement of the grinding unit relative to the workpiece.

Figure 1:
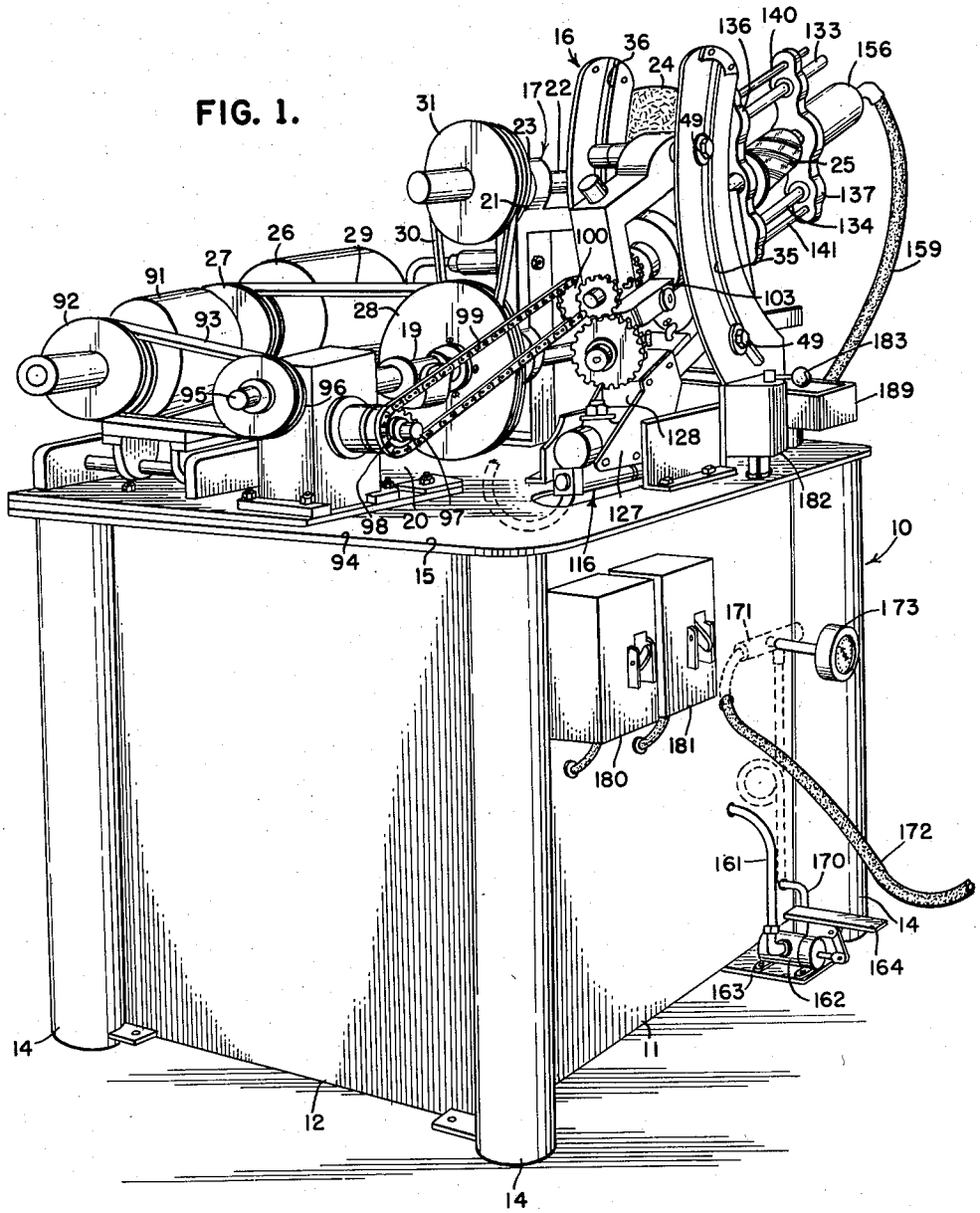
Fig. 1 is a perspective view of the glass cutting machine showing the general relationship of parts with the machine being shown in operating position.

Referring more particularly at this point to Figs. 1 and 2, the reference numeral 10 indicates generally the base portion of the machine which includes a front wall 11, opposite side walls 12 and 13, all of which extend between the vertical legs 14 which form the main support for the base. The rear of the base assembly is open for a purpose which will be presently apparent.

The base structure 10 is provided with a top plate 15 which forms a base upon which two independently mounted units are supported. These units are the work-holding unit which is generally indicated by the reference character 16 and the grinding unit which is indicated generally by the reference character 17.

The grinding unit takes the form generally of one of the grinding units which are disclosed and specifically described in my co-pending application Serial No. 380,225, filed September 15, 1953, now Patent No. 2,795,087, dated June 11, 1957, and entitled Cutting or Grinding Machine. Basically, the grinding unit 17 includes a main support shaft 18 which is suitably journaled within bearings such as that indicated by the reference character 19 in Fig. 1 and which is supported by the pedestal 20 as shown. Associated with this main support shaft 18 is a frame 21 which supports the grinding wheel shaft 22 in bearing bosses 23 and which frame is swingable about the main support shaft 18.

In my co-pending application Ser. No. 380,225, Patent No. 2,795,087, for Cutting or Grinding Machine, the similar frame for the grinding unit is normally spring urged in one direction so that under the action of the urging springs the grinding wheel engages a work piece held in the center unit disclosed in that application. For the purpose of this invention, an identical spring urging action may be utilized but it has been found that in cutting spiral patterns in glassware, as is contemplated by this invention, a more efficient engagement of the grinding wheel with the work is occasioned by utilizing a system of pulleys and a cable connected at one end to the grinding unit frame and at its other end to a freely suspended weight, the weight hanging below the base top 15 within the confines of the walls 11, 12 and 13. It is for this reason that the rear of the base 10 is left open so that different weights may be utilized in conjunction with different patterns to be cut or with different articles of glassware.

The grinding unit in this invention may or may not, as desired, embody the eccentric adjustments about the main support shaft 18 as is embodied in my co-pending application Serial No. 380,225, Patent No. 2,795,087. Also, as in my copending application Serial No. 380,225, Patent No. 2,795,087, it is herein contemplated to utilize a hydraulic piston and cylinder arrangement for urging the swinging frame of the grinding unit in a direction such that the grinding wheel moves away from the work piece held by the unit 16.

Since a clear understanding of the grinding unit can be had by reference to my co-pending application Ser. No. 280,225, Patent No. 2,795,087 a further description of the unit is believed to be unnecessary except to relate that the frame 21 is adjustably movable in a horizontal plane about a fixed pivot point which is subtantially directly under the point of contact between the grinding wheel 24 and the work piece which is indicated by the reference character 25 in Figs. 1 and 2. This also corresponds to the arrangement and structural features embodied in my co-pending application Serial No. 380,225, Patent No. 2,795,087.

The drive transmitted to the grinting wheel 24 is accomplished by means of an electric motor 26 mounted on the base top 15 and this motor drives the pulley 27 which is feathered to its shaft, the pulley 27 in turn driving the pulley 28 through the medium of the belt 29 as will be clear. The pulley 28 is journaled on the main support shaft 18 and is of the plural type which may embody the large pulley seen in Fig. 1 as well as smaller pulleys over one of which a belt 30 is trained, this belt being also trained over an adjustable type pulley 31 which is keyed to the grinding wheel drive shaft 22. The pulley 28 may embody as many stepped pulleys as is desired and, of course, the pulley 31 being of the expansible type, can accommodate for use of these several stepped pulleys to vary the speed of the grinding wheel 24 to suit conditions.

The work-holding unit 16 embodies a base portion 32 which is rigidly and fixedly secured to the base top 15 and which embodies a pair of spaced substantially vertical uprights 33 and 34, each of which is provided with an arcuate slot 35 and 36 respectively extending from the upper end thereof. The upper end of each slot 35 and 36 is closed by means of the strips 37 and 38 which are bolted directly to the upright as by the fasteners 39.

The main component part of the work-holding unit is shown in Fig. 3 and will be seen to include a support frame indicated generally by the reference character 40 which is of open rectangular configuration generally having the spaced vertical leg portions 41 and 42 interconnected by upper and lower frame members 43 and 44. A pair of studs 45, 46 and 47, 48 are associated with the upper and lower frame members 33 and 34 respectively and these studs are adapted to project through the arcuate slots 35 and 36 and receive thereon retaining nuts 49 for the purpose of holding the movable component of the work-holding unit in proper relation between the uprights, the purpose of this adjustment being apparent presently. The studs 45, 46, 47 and 48 may be of the through type such that each designated pair of studs is in reality the opposite end of a single stud in which case the spacer blocks 50 are rigidly affixed to the studs as by set screws 51. Otherwise, if the various studs 45, 46, 47 and 48 are in fact single studs which are threaded into the support frame 40, the spacing blocks 50 may be integrally formed with the frame members. In any case, the specific construction does not alter the operation of the machine, it being merely necessary that there be provided some special means on opposite sides of the frame so as to permit the uprights 33 and 34 to be sufficiently spaced apart so as to clear all of the working parts of the movable part of the work-holding unit which are disposed between the uprights.

Journaled in the support frame are three separate shaft members 52, 53 and 54. The shaft 52 will be designated hereinafter as the cam shaft whereas the shaft 53 will be designated hereafter the main drive shaft; and the shaft 54 the auxiliary drive shaft or control shaft. The cam shaft projects through the vertical leg 42 and into an enlarged portion 55 of the upper frame member 43 and it is to be understood that suitable bushing is provided in the openings in both of such members to suitably and properly journal the shaft. It is preferred also that thrust bearing members of the ball or roller type be disposed on opposite sides of the gear 56 which has its collar portion 57 affixed to the shaft 52 as by the set screw 58. Such thrust bearings are indicated by the reference characters 59 and 60.

The cam drive shaft 53 is journaled in bushings 61 and 62 in apertures through the legs 41 and 42, and suitably feathered upon the shaft is a gear member 63 which is in mesh with the previously mentioned gear 56. Further there is mounted on the shaft a slip type clutch assembly indicated generally by the reference character 64 and which will be more specifically described hereinafter. Finally, there is a gear 65 mounted on one end of the shaft 53 adjacent the vertical leg 41, there being preferably a thrust washer 66 disposed between such gear and the leg 41. Between the clutch assembly 64 and the frame leg 41 is a roller or ball type thrust bearing 67 and between the gear 63 and the frame leg 42 is another similar thrust bearing 68.

The shaft 54, like the shaft 53, is journaled in the frame legs 41 and 42, bushings 69 and 70 being provided for this purpose and this shaft has suitably feathered thereon a gear 71 in mesh with the gear 65 on the main drive shaft and also has mounted thereon between the frame members 41 and 42 a camming disc 72. This camming disc is loosely engaged over the shaft 54 and on opposite sides thereof are the adjusting nuts 73 and 74 which clamp the cam disc therebetween, the shaft being threaded as at 75 in the area in which the cam disc is to be placed. Since, as will be presently apparent, there will be thrust only in one direction on the shaft 54, only a spacing collar 76 is utilized between the adjusting nut 74 and the frame upright 42 whereas to prevent longitudinal movement of the shaft in the opposite direction and to take up thrust, there is mounted between the frame member 41 and a collar 77 fixed to the shaft a suitable thrust roller bearing or the like 78.

It will be noted that all of the shafts 52, 53, and 54 are disposed in parallelism and that they are disposed in a common plane with the main drive shaft 52 and the control shaft 54.

One form which the slip type clutch may take is shown specifically in Fig. 8 although it is to be understood that this showing is for the purpose of clarification only and is not intended to show a specific clutch which necessarily must be used. The slip type clutch must be of such construction as to slip upon a substantially constant and preset amount of torque application and it must slip in either direction of rotation. Other than this, the clutch may be of any specific construction.

The clutch shown in Fig. 8 includes an inner hub portion 79 which is keyed as indicated by the reference numeral 80 directly to the main drive shaft 53 and hence rotates therewith. The driving portion of the clutch includes the outer hub portion 81 and an integral lateral extension 82 which terminates in the worm gear 83 as shown. The driven inner hub 79 has a plurality of circumferentially space ribs or splines 84 and clutch plate members 85 are provided with inner circumferentially spaced notches receiving such splines so that the discs 85 rotate with the inner hub 79 but are slidable longitudinally therealong as will be readily apparent. The innermost disc 85 engages a stop shoulder 86 on the inner hub 79 and to normally urge these discs 85 together there is provided a pressure plate ring 87, an annular spring washer 88 and an adjusting nut 89. The ribs 84 are threaded for the reception of the adjusting nut 89 and as will be readily apparent an adjustment of the nut varies the spring tension of the spring disc 88 against the pressure ring member 87 and consequently more or less forcefully urges the various discs 85 toward each other. Interposed between the discs 84 are a pair or more of complementary disc members 85ᵃ which have circumferentially spaced tongues 85ᵇ which project into the series of circumferentially spaced grooves 81ᵃ on the inner surface of the outer hub member 81. In this manner, the complementary discs 85ᵃ are rotatably carried by the outer hub 81 but are slidable longitudinally therealong and, as will be seen, since these complementary discs are sandwiched between the discs 85 and since the entire assemblage is urged under the action of the spring annulus 88 into interengagement, a clutching action will be had between the two hubs 79 and 81. Further dependent upon the adjustment made upon the nut 89 and consequently the pressure exerted by the spring annulus 88 is the amount of torque which can be transmitted between the two hubs 79 and 81 and in this particular type of clutch since the coefficients of friction are substantially constant, upon any other adjustment of the nut 89, a substantially constant release load is attained. Further, the design of clutches of this nature is such as to permit slippage between the parts without detrimentally affecting the operation of the clutch or destroying its component parts except after long and continued use.

The drive for the work-holding unit 16 originates with the electric motor 91 which carries an adjustable type pulley 92 over which a belt 93 is trained. The motor 91 is securely mounted to the base top 15, and is mounted for movement transversely thereof toward and away from the gear reduction unit 94 which is fixed rigidly to the base and which includes an input shaft 95 having a pulley 96 mounted thereon associated with the previously mentioned belt 93 so that drive is transmitted directly from the motor 91 directly to the gear reduction unit 94. If it is desired to step up or step down the drive ratio between the electric motor and shaft 95, it is merely necessary to change the pulley 96 to a larger or smaller diameter, or a limited amount of speed adjustment of the motor shaft 91 and gear reduction shaft 95 may be accomplished by moving the motor away from or toward the gear reduction unit to form an increase or decrease of the effective diameter of the adjustable pulley 92.

The speed reduction unit 94 also incorporates an output shaft 97 provided with a sprocket 98 having a chain element 99 trained thereabout and this chain extends therefrom over a sprocket 100 which is keyed to the same shaft 101 as is the worm or worm spiral 102 which drives the worm gear 83 previously described. This construction is seen most clearly in Fig. 6 and, as therein shown, there is a worm housing 103 which is integral with the frame leg 41 and which projects inwardly thereof to support the transverse horizontal shaft 101 to which the elements 100 and 102 are keyed. Thrust bearings 104 and 105 are disposed between the opposite ends of the worm spiral 102 and the adjacent inner faces 106 and 107 of the housing.

The control shaft 54 controls the movement of both the main drive shaft 53 and the cam shaft 52 inasmuch as the cam disc 72 is provided with a stop pin 108 which will permit only somewhat less than one complete revolution of the control shaft 54 in either direction before such stop pin engages against an abutment plate 109 which is disposed in the path of movement of the stop pin. This construction is seen more clearly in Fig. 7 wherein the abutment plate 109 will be seen to be rigid with a generally similar shaped retained member 110 which has opposite depending leg portions 111 and 112 which embrace the lower frame member 44 and thus prevent transverse movement of the member 110 with respect to the frame 40.

A retaining bolt 113 projects upwardly through the lower frame member 44 and is threaded into a locking plate 114 which overlies the member 110. Thus, when the cam disc 72 is rotated from the position shown in Fig. 7 to a position in which it abuts the other side of the abutment plate 109, the drive shaft 53 and the cam shaft 52 will likewise be permitted to rotate as dictated by the specific gear ratios between the shafts as accomplished by the gears 65 and 71 on the one hand, and the gears 63 and 56 on the other hand.

The cam disc 72 also has rigidly mounted thereon, on the opposite side thereof to the pin 108, a double ended cam 115 which is adapted to actuate the hydraulic pump assembly indicated generally by the numeral 116 by engaging the upper end 117 of the rock shaft 118, the lower end of which is connected by means of the adjustable linkage 119 to the idler crank assembly 120. The pivot point for the rock shaft 118 is accomplished preferably by providing a through stud for the members 47 and 48 previously described, this construction being readily apparent by studying Fig. 4. The upper end 121 of the idler crank 120 projects into an opening in a lower portion of the frame member 44, as will be most clearly seen in Fig. 6, wherein this opening is indicated by the reference character 122. A pin 123 projects transversely through the frame member 44 and through the upper end of the idler crank so as to pivot the same at this point on the frame. The lower end 124 of the idler crank is connected as by means of a pin member 125 to one end of an actuating plunger 126 of the hydraulic pump assembly 116. The hydraulic pump assembly 116, as shown, takes the form of a conventional master cylinder as utilized in the automotive field. This master cylinder is rigidly connected and supported from the frame assembly 40 by means of a pair of plate elements 127 and 128 which are secured to the frame by means of any suitable fasteners 129 and 130. The master cylinder 116 is suitably connected between the plates 127 and 128 and is thus rigid with the frame.

The master cylinder 116 is connected through a hydraulic conduit 131 to the wheel cylinder assembly 132 which actuates the grinding unit frame 17 in opposition to the means which normally urges such frame in a direction such that the grinding wheel 24 engages the work piece 25. Thus, when the cam disc 72 is at such a point that the cam 115 thereon operates the master cylinder linkage, the grinding wheel 24 will be moved or swung out of engagement with the work piece 25, this action taking place substantially concurrently with the engagement of the stop pin 108 against the abutment plate 109.

Each of the shafts 52 and 54 has supporting end projections 133 and 134 which slidably carry a carriage assembly which is indicated generally by the reference character 135. This carriage 135 includes two end support members 136 and 137, each of which is apertured at the top and bottom thereof in the boss portions 138 and 139 and such boss portions receive therethrough the adjusting and interconnecting rods 140 and 141. The distance between the support members 136 and 137 is maintained by engaging the various set screws 142, 143, 144 and 145 against the rods 140 and 141. The support member 137 has other boss portions 146 and 147 which are bushed as denoted by numerals 148 and 149 for snugly and slidably receiving the shafts 133 and 134 respectively.

The main drive shaft 53 also has a projecting support end portion 150 which has diametrically opposed splines 151 and 152 thereon which extend longitudinally thereof from the free end to closely adjacent the framed upright 42. The support member 136 has an integrated boss portion 153 which has rotatably mounted therein the driving head assemblage 154 of a driving chuck. The support member 137 also has an integrated boss portion 155 within which one end of a cylinder 156 is rigidly secured, there being a piston within the cylinder connected to the piston rod 157 which terminates in the tail assemblage 158 forming in conjunction with the drive head assembly 154 the chucking arrangement for holding the work piece 25 on the carriage. The piston within the cylinder 156 and its associated piston rod 157 are normally spring urged in a direction to the right in Fig. 3, and a conduit 159 is connected to the cylinder 156 so as to lead to a source of suitable pneumatic pressure whereby, under the action of pneumatic pressure, the tail assembly 158 may be forced into engagement with one end of the work piece 25 to urge the opposite end thereof to driving engagement with the driving head assembly 154. The construction of this chuck forms no part of this invention and it is to be noted that it may be identical with the construction described in my co-pending application Ser. No. 380,225, Patent No. 2,795,087.

The conduit 159 is flexible and is connected to the inlet connection 160 of the cylinder 156 and at its opposite end to a tube 161 which projects through the side wall 13 into the interior of the base assembly 10 in a manner shown most clearly in Fig. 2. The tube 161 then leads to a valve assembly 162 of any suitable type which is mounted upon a plate member 163 resting on the floor and which may, if desired, be attached to the wall 11. Also mounted on the plate 163 is a treadle member 164 having a pivot at the pin member 165 and including a depending actuating arm 166 rigid therewith which connects pivotally as at 167 to a plunger 168 leading into the valve housing 162 and operating the same to connect and disconnect the tube 161 with the valve inlet connector 169. This valve inlet connector 169 is connected by suitable conduit 170 to a manifold member 171 which in turn is connected to a flexible line 172 leading to a suitable source of air under pressure. Preferably, the connection 170 and the manifold 171 are disposed interiorly of the base and it is also desired that a pressure valve 173 be connected to the manifold so that the operator of the machine may be apprised of the air pressure which is available at the treadle valve 162.

The operation of the treadle valve is such that when the treadle member 164 is depressed, the air supply from the inlet line 172 to the line 159 which connects to the cylinder 156 is interrupted. When the treadle valve is in its normal position, the conduit 159 and the cylinder 156 are connected to the source of air under pressure such that the chuck assembly will grip the work piece 25.

Referring most particularly to Figs. 3 and 5, it will be noted that there is mounted on the cam shaft extension 133 a spiral cam member or worm 174 which has a spiral cam track 175 formed in its cylindrical surface, the cam being located on the cam shaft extension 133 by means of two set collars 176 and 177. The carriage frame member 136 is provided with a boss portion 178 which is apertured to receive therethrough the cam 174. Projecting inwardly from one side of the boss 178 is a cam follower 179 which has a free end portion projecting radially inwardly in the aperture 180 in the boss so as to project into the cam track 175 so that when the cam shaft 52 is rotated, the cam follower will cause the carriage assembly 135 to move in a linear path along the supporting portions 133 and 134 of the cam shaft 52 and the control shaft 54. At the same time, the driving portion of the chuck 154 slides along the supporting portion 150 of the main drive shaft 53 but is rotated therewith by virtue of the splines 151 and 152 which are received within keyways in the body of the chuck assembly 154. Thus the work piece 25 held in the chuck assembly will be simultaneously rotated and moved in a linear path past the grinding wheel 24 such that a spiral pattern will be cut on the outer surface of the work piece 25.

For the purpose of controlling the motor 26 which drives the grinding wheel 24, an electric switch 180 is mounted on the front wall 11 of the base 10 and a secondary control switch 181 is mounted in side-by-side relation thereto for controlling power input to the electric motor 91 which drives the work holding unit. An operator's control switch 182 is mounted on the base top 15 adjacent the front edge thereof and this switch embodies an operating handle 183 and is of the three-position type, having forward, reverse and stop positions.

As will be seen most clearly in Fig. 2, there is a set screw member 184 threaded into the cam 174 and engaged against the supporting end 133 of the cam shaft 52 so that the cam 174 will be rotated therewith. Immediately behind the cam 174 is the upright 185 of a splash pan member indicated generally by the reference character 186. This splash pan has in its upright portion suitable apertures so that the various shafts 133, 134 and 150 may pass therethrough and preferably surrounding the lowermost shaft 134 is a neoprene seal 187 so that cooling liquid such as water which is played upon the grinding wheel during the cutting operation by mechanism, not shown, will not enter the shaft and injure the parts of the work holding unit. The other shafts 133 and 150 may also be provided with similar seals but in actual practice it has been found that they are of sufficient height with respect to the grinding wheel of the unit that it is not necessary to provide seals at this point. The horizontal portion 188 of this member 186 projects beneath the point of contact between the grinding wheel and the work and is in the form of an open ended trough so that cooling liquid flowing therealong will pass into the catch basin 189 which is supported upon the base top 15 by means of its outlet pipe 190 which passes through the overhanding edge of the base top 15. Of course a suitable drain conduit is connected to the lower end 191 of the drain pipe 190.

In operation, the treadle 164 is depressed so as to allow the chuck plunger rod 157 to be retracted and a work piece 25, in this particular case a tumbler, is placed with its open end in engagement with the drive head 154 of the chuck whereafter the treadle 164 is released and allowed to return to its normal position which will connect the conduit 159 with the source of air pressure leading in through the line 172 so that the cylinder plunger 157 will force the resilient chuck tail stock piece 192 against the bottom of the tumbler 25, thus firmly holding the work piece in place. The carriage assembly 135 must be at this point either in the position shown in Fig. 3 or in the position shown in Fig. 2 wherein it is at either one of its opposite ends of travel, that is with the stop pin 108 engaged against one side or the other of the abutment plate 109 and with the cam 115 fully engaged with the rocker arm 118 so that the grinding wheel 24 is forced to swing away from the work piece out of engagement therewith.

The switch 180 is then thrown so as to start the rotation of the grinding wheel and the switch 181 is also thrown with the switch arm 183 in the stop position. If the parts are in the position shown in Fig. 3, the switch arm 183 is thrown then into the forward position such as to cause counterclockwise rotation of shaft 101 which will cause counter-clockwise rotation of the main drive shaft 53 as viewed from the supporting end projection 150 with the control shaft 54 rotating clockwise and the cam shaft 52 likewise rotating clockwise, as viewed from the extensions 133 and 134. This clockwise rotation of the cam shaft 52 and consequently the spiralworm 174 will cause movement of the carriage assembly to the right in Fig. 3.

As soon as there has been caused sufficient rotation of the control shaft 54 to allow the rocker arm 118 to be disengaged from the cam 115, the spring or weight mechanism which normally urges the grinding unit frame 17 to swing toward the work piece 25, will operate and cause the edge 193 of the grinding wheel 24 to contact the outer surface of the tumbler 25. The lead of the spiral trackway 175 of the cam 174 of course controls the lead of the pattern cut in the surface of the tumbler 25 and in order that the plane of the grinding wheel 24 corresponds with the angle of the pattern cut on the glass 25, the workholding unit as previously set up to exactly position the tumbler 25 at an angle with the plane of the grinding wheel 24 such that the proper condition exists. This is, of course, accomplished by moving the main component of the work-holding unit within the arcuate slots 35 and 36 of the uprights 33 and 34 and for this purpose one of the uprights 33 may be provided with suitable indicia or marks on its outer surface which register with the stud portion 45 so that the main component of the work-holding unit may be properly set up. Several indicia may be so marked on the outer face of the upright 33 which correspond to standard pattern leads.

Since in many cases the work piece 25 will be tapered, and since also these tapers may vary from one type of article to another, the grinding unit 17 may be swung in its entirety about a point which is substantially directly below the point of contact between the grinding wheel and the work, and to this end, the entire grinding unit including its electric drive motor 26, is mounted upon a common mounting plate which in turn is adjustably secured to the base top 15 to swing about the point desired.

Generally speaking, it is preferable to maintain the plane of the grinding wheel 24 substantially perpendicular to the cylindrical outer surface of the tapered work piece 25 in order that a uniform design will be cut into the surface of the glass. It will be noted in this respect that the edge 193 of the grinding wheel 24 is preformed according to a definite pattern as will be clear from Fig. 9. Of course, any desired pattern may be formed in the edge surface of the grinding wheel as will be readily apparent.

The movement of the carriage assembly 135 will continue until such time as the stop pin 108 has moved from its position as shown in Fig. 3 to abut the opposite side of the abutment member 109 at which point the shaft 54 cannot move and thus the drive of both the shaft 53 and 52 will be interrupted since the clutch assembly 64 will then slip even though the drive motor 91 is continuing to rotate.

Just prior to the engagement of the stop pin 108 with the opposite side of the abutment plate 109 the cam 115 will have engaged the upper end 117 of the rock shaft 118 to start movement of the master cylinder plunger 126 and, consequently, start the swinging movement of the grinding unit frame 21 away from the work piece 25. The grinding wheel 24 thus disengages the surface of the work piece 25 just prior to engagement of the stop pin 108 with the abutment plate 109 and, at this time, one complete cycle of operation is completed.

Usually one operator will attend to several of these grinding machines and some period of time may elapse between the completion of one cycle and the start of another cycle and, during this time, it will be appreciated that the drive motor 91 continues its rotation with the clutch assembly 64 slipping. When the operator is able to direct attention to the machine once again, the operating handle 183 of the switch 182 is thrown to the stop position, cutting current flow to the drive motor 91. The operator then depresses the treadle 164 and removes the finished work piece 25 from the chuck assembly and inserts a new work piece. The operating handle 183 of the switch 182 is then thrown in the reverse position and the cycle is then repeated but in a reverse position, that is, with the carriage 135 moving from the position shown in Fig. 2 back to the position shown in Fig. 3. Thus, each linear movement of the carriage assembly 135 in either direction serves to accomplish a complete cycle of operation upon an associated work piece 25.

To accommodate for longer or shorter work pieces 25, it will be realized that the work-holding unit carriage 135 may be adjusted to suit the length of such work piece. This is accomplished by backing off the two set screws 143 and 145 associated with the carriage frame piece 137 and moving such frame piece toward or away from the opposite frame piece 136 so that the effective reach of the chuck assembly is accordingly shortened or lengthened. When the proper grip between the chuck drive, head 154 and its tail stock 158 is arrived at, the set screws 143 and 145 are tightened to lock the frame piece 137 in place and, of course, pieces of a corresponding length may then be successfully engaged within the carriage and the cutting operation continued.

It is preferred that the gear 56 on the cam shaft 52 be considerably smaller than the gear 63 on the main drive shaft 53 which engages therewith. The reason for this is that it is desirable that the cam shaft 52 rotate at a considerably higher speed than the main drive shaft 53 in order to allow the lead of the spiral trackway 175 of the cam 174 to be within practical limits. The lead of the spiral cam track 175 is of course not the same as the lead of the pattern cutting the glass but would only be so if the shafts 52 and 53 rotated at the same speed. The cam 174 is, of course, easily removed from the cam shaft and a new cam having a different pitch inserted in lieu thereof so as to accommodate for different pattern leads cut on an associated work piece 25. It is usually desirable to correlate the lead of the pattern with the length of the work piece so that the pattern will be cut uniformly along the length thereof. That is, upon a relatively short tumbler, it may be desirable to have the pattern extend once entirely around the outer surface of the glass whereas in medium sized tumblers, it may be desirable to have the pattern extend one and one-half times around the surface of the glass, and with extremely long tumblers, the pattern may extend twice completely around the glass.

The precise point at which the pattern starts and stops is, of course, controlled by the rotational relationship which exists between the main drive shaft 53 and the control shaft 54 as occasioned by the gears 65 and 71 which interconnect the two. Thus, if the gear 65 in Fig. 3 is made larger and the gear 71 is made correspondingly smaller, the control shaft 54 will rotate faster than the particular relationship shown in Fig. 3 and will consequently cause the stop pin 108 and cam 115 to operate in a much shorter period of time. For instance, assuming that the particular gear relationship between the gears 65 and 71 in Fig. 3 corresponds to cut a pattern which extends one and one-half times completely around the work piece 25, the change to a larger gear for the existing gear 65 and a smaller gear for the existing gear 71 could be made to have the pattern extend only once completely around the surface of the glass although, of course, with the same cam 164 being used, in the second case the pattern would extend over a shorter length of surface area on the work piece 25. Therefore, in order that the pattern in the second case would extend over substantially the entire length of the glass, it would be necessary to change the cam 174 to one having a greater lead so that the linear movement of the carriage 135 would be correspondingly faster to accommodate for the change in the relationship of the gears 65 and 71.

Referring most particularly at this point to Fig. 9, the reference character 200 indicates a plate member which forms the base upon which all of the component parts constituting the grinding wheel unit are mounted. This plate member 200 is adjustably pivotally secured to the base top member 15 by means of a bolt member 201 as will be seen most clearly in Fig. 2. Of course, other holddown bolts are projected through the members 15 and 200 to retain any desired pivotal adjustment, but when adjusting the grinding unit, the bolt member or equivalent mechanism is utilized as the pivot about which the plate 200 is swung. The purpose of this construction will be presently apparent.

Mounted on this plate 200 in addition to the elements previously described which constitute the grinding wheel unit, is a pedestal 202 which has secured thereon an hydraulic motor 203 which in the particular instance shown is of the type commonly employed as a wheel cylinder for automotive vehicles. Preferably this motor 203 embodies an outer casing defining a cylinder closed at one end and which has slidable therein a piston having a plunger member 204 projecting therefrom. The wheel cylinder 203 is coupled with the previously mentioned hydraulic pump or master cylinder member 116 through the medium of the flexible conduit 131 and as will be obvious, when the master cylinder 116 is operated the plunger 204 will force the lower end 205 of the operating arm 206 to the right in Fig. 9. This operating arm is pivoted by means of the shaft member 207 to the pedestal 202 and the upper end thereof 208 is pivotally secured to a sleeve member 209 by means of a stud 210 rigid with the latter. The sleeve 209 is slidable over the elongate threaded shaft 211 and has disposed at opposite ends thereof the lock nuts 212 to retain the sleeve at a particular position along the shaft 211. The shaft 211 terminates in a clevis 213 pivotally connected as at 214 to the upper end 215 of an operating lever which is connected to the frame 21 of the grinding wheel unit 17. For this purpose, the lower end of the operating lever may be provided with the spaced strap portions 216 and 217 which engage with the arm portion 218 of the frame 21 and which are retained thereon by means of the bolt member 219, as will be seen.

To provide a stop for the lower end 205 of the operating arm 206, a vertical plate portion 220 of the pedestal 202 may be provided with a threaded aperture which receives a stop bolt member 221 which is in turn locked in position by means of the lock nut 222, adjustment being made as required. The purpose of the hydraulic motor 203 and its associated leverage system connected to the frame 21 is, of course, to swing the grinding wheel carried by the shaft 22 out of engagement with the workpiece 25 at the end of the operating cycle of the assemblage. The mechanism which swings the grinding wheel in engagement with the workpiece in opposition to the hydraulic motor 203, as previously described, includes a system of pulleys and a cable and weight which normally urges the frame 21 to swing in a direction toward the workpiece. One end of the cable of this system is indicated by the reference character 223 in Fig. 9 and as will be seen, this cable is connected to a point adjacent the upper end of the operating lever 215 and as will be obvious a weight suspended at the end of a vertical portion of the cable 223 will swing the frame 21 in a direction to engage the grinding wheel with the workpiece.

Reference is had now more particularly to Fig. 10 wherein there is a diagrammatic showing of the particular location of the pivot bolt member 201, previously described, which adjustably attaches the base member 200 of the grinding wheel unit or assemblage to the base 15 of the machine. The pivot point achieved by the bolt member 201 in Fig. 2 is indicated by the reference character A in Fig. 10 and as will be seen is at a point which is substantially directly below the surface of the workpiece 25 against which the grinding wheel 193 engages. Further, it is preferred that this pivot point A lie within the plane B which divides the grinding wheel 193 into equal circular halves. The purpose of putting the pivot point at the location A is so that the grinding wheel unit which is self contained can be swung in its entirety about the point A so as to always maintain the line C which is parallel to the axis of rotation of the grinding wheel 193 at the same angularity as the outer surface of the workpiece 25, as will be clearly apparent in Fig. 10. This is necessary since various types or forms of workpieces will have different tapers thereon and it is desired that the cutting face 230 of the grinding wheel 193 always engage the surface of the workpiece at right angles thereto. The reason for this is that the design to be cut into the surface of the workpiece 15 is contoured directly into the cutting face 230 of the grinding wheel 193 and it is desired that the configuration of the pattern be uniform throughout the substantial width of the cutting surface and this engagement can only be achieved if the line C is parallel to the line D which defines the outer surface of the workpiece.

I claim:

1. A glass grinding machine comprising a base, a work-holding unit mounted on said base, and a grinding unit mounted on the base beside the work-holding unit, said work-holding unit including a pair of uprights having elongate arcuate slots therein, a support frame disposed between said uprights and having studs thereon projecting through the arcuate slots whereby the support frame is adjustable angularly within a vertical plane, support shafts projecting from said frame, a carriage slidably mounted on said support shafts, said carriage including a chuck for holding a work piece said grinding unit including a grinding wheel movable into and out of engagement with a work piece held in said chuck, means for rotating said chuck and moving said carriage along said support shafts while the grinding wheel is in engagement with a work piece held in the chuck whereby to cut a spiral pattern on the work piece.

2. A machine for cutting spiral patterns in glassware which comprises a base having a work-holding unit and a grinding unit mounted in side-by-side relation thereon, said work-holding unit including a support frame having a pair of vertically spaced and parallel support shafts projecting therefrom, a carriage slidably mounted on said support shafts, one of said shafts having a spiral cam fixed thereon and a cam follower on said carriage engaged with said cam whereby rotary motion of said one shaft imparts linear motion to said carriage, said carriage including a chuck for rotatably mounting a work piece, said grinding unit including a grinding wheel swingably mounted for movement into and out of engagement with a work piece held in said chuck, means for simultaneously rotating said one shaft and said chuck while said grinding wheel is in engagement with a work piece held in the chuck, the last mentioned means including mechanism for swinging said grinding wheel out of engagement with the work piece when the carriage has reached its extent of linear movement.

3. In a work-holding unit for use in glass grinding machines, a support frame, a main drive shaft rotatably mounted in said frame and projecting therefrom, a control shaft and an auxiliary drive shaft rotatably mounted in said frame on opposite sides of and parallel to said main drive shaft, said control shaft and said auxiliary drive shaft each having support portions projecting from said frame, a carriage slidably carried by said support portions, a chuck carried by said support frame and including a driving head slidably engaged with the projecting end of said main drive shaft, a spiral cam fixed to said auxiliary drive shaft, a cam follower carried by said support frame and engaged with said spiral cam, means drivingly interconnecting said main drive shaft with said auxiliary drive shaft and with said control shaft.

4. In a work-holding unit for use in glass grinding machines, a support frame, a main drive shaft rotatably mounted in said frame and projecting therefrom, a control shaft and an auxiliary drive shaft rotatably mounted in said frame on opposite sides of and parallel to said main drive shaft, said control shaft and said auxiliary drive shaft each having support portions projecting from said frame, a carriage slidably carried by said support portions, a chuck carried by said support frame and including a driving head slidably engaged with the projecting end of said main drive shaft, a spiral cam fixed to said auxiliary drive shaft, a cam follower carried by said support frame and engaged with said spiral cam, means drivingly interconnecting said main drive shaft with said auxiliary drive shaft and with said control shaft, means for reversibly driving said main drive shaft including a slip-type clutch, a stop pin fixed to said control shaft, and an abutment member fixed to said support frame in the path of movement of said stop pin.

5. In a work-holding unit for use in glass grinding machines, a support frame, a main drive shaft rotatably mounted in said frame and projecting therefrom, a control shaft and an auxiliary drive shaft rotatably mounted in said frame on opposite sides of and parallel to said main drive shaft, said control shaft and said auxiliary drive shaft each having support portions projecting from said frame, a carriage slidably carried by said support portions, a chuck carried by said support frame and including a driving head slidably engaged with the projecting end of said main drive shaft, a spiral cam fixed to said auxiliary drive shaft, a cam follower carried by said support frame and engaged with said spiral cam, means drivingly interconnecting said main drive shaft with said auxiliary drive shaft and with said control shaft, means for reversibly driving said main drive shaft including a slip-type clutch, a circular plate fixed to said control shaft, a stop pin projecting from said plate, and an abutment member fixed to said support frame in the path of movement of said stop pin to limit the rotary motion of said control shaft in either direction of rotation and thereby cause the drive clutch to slip and interrupt drive to the main drive shaft and consequently limit the linear movement of said carriage.

6. A glass grinding machine comprising a base, a work-holding unit mounted on said base, and a grinding unit mounted on said base beside the work-holding unit, said work-holding unit including a pair of uprights disposed in spaced relation to each other and having vertically elongate arcuate slots therein, a frame disposed between said uprights and having fastening means extending from opposite sides thereof projecting through said arcuate slots whereby vertical shifting of said frame alters the angularity thereof, a main drive shaft rotatably mounted in said frame and projecting therefrom in a direction lying parallel to but between said uprights, a control shaft and an auxiliary drive shaft rotatably mounted in said frame on opposite sides of and parallel to said main drive shaft, a carriage slidbly carried by said control and auxiliary drive shafts with said control and auxiliary drive shafts projecting beyond the end of said main drive shaft to present the portions thereof which support said carriage, a fixed chuck element secured to said carriage and embracing said main drive shaft, means mounting said fixed chuck element for rotation with said main drive shaft while permitting axial sliding movement of the chuck element along said main drive shaft, a second chuck element fixed to said carriage in spaced relation to the first chuck element and movable toward and away therefrom to cooperate with the first chuck element for gripping glassware therebetween, means for selectively urging the movable chuck element toward the fixed chuck element, a spiral cam fixed to said auxiliary drive shaft, a cam follower carried by said frame and engaged with said spiral cam, means drivingly interconnecting said drive shaft with said auxiliary drive shaft to simultaneously rotate the glassware held between said chuck elements and move said carriage axially of said drive shaft, and a grinding unit mounted on said base to one side of the work-holding unit and fixed against movement axially of said drive shaft for engaging the glassware and cutting a spiral pattern therein as said main drive shaft is rotated.

7. In the glass grinding machine defined in claim 6 wherein said carriage comprises a pair of spaced parallel support bars extending transversely between said auxiliary drive shaft and said control shaft, that support bar which is disposed most closely adjacent said frame having apertured boss portions freely passing said auxiliary drive and control shafts and having opposite end portions projecting on opposite sides thereof, the other support bar having apertured bosses slidably journaled on those portions of the auxiliary drive and control shafts which project beyond the end of said main drive shaft and also having opposite end portions projecting on opposite sides thereof, a pair of interconnecting rods fixed between corresponding opposite end portions of said support bars and said interconnecting rods, said auxiliary drive shaft, said main drive shaft and said control shaft lying in a common plane, said one support bar having said fixed chuck element journaled therein and said other support bar carrying said movable chuck element.

8. The glass grinding machine as defined in claim 7 wherein said grinding unit includes a grinding wheel swingable into and out of engagement with glassware held between said chuck elements and means for swinging said grinding wheel into and out of engagement with such glassware, a cam fixed to said control shaft, means actuated by said cam for actuating the means for swinging said grinding wheel and operable to move said grinding wheel away from the work, drive means interconnecting said main drive shaft and said control shaft for rotating said control shaft substantially one complete revolution as said carriage is moved between the opposite ends of its path of movement, means for stopping movement of said carriage at the opposite ends of its path of movement, and a power input shaft having driving connection, including a slip-type clutch, with said main drive shaft.

References Cited in the file of this patent

UNITED STATES PATENTS

| | | |
|---|---|---|
| 1,608,367 | Buckingham | Nov. 23, 1926 |
| 1,650,345 | Greer | Nov. 22, 1927 |
| 1,750,031 | Sykes | Mar. 11, 1930 |
| 2,171,007 | Rice | Aug. 29, 1939 |
| 2,310,977 | Mathys | Feb. 16, 1943 |
| 2,314,533 | Wallace | Mar. 23, 1943 |
| 2,346,724 | Briney | Apr. 18, 1944 |
| 2,362,873 | Wessman | Nov. 14, 1944 |
| 2,388,066 | Markus | Oct. 30, 1945 |